US012699420B2

(12) United States Patent
Lee et al.

(10) Patent No.: US 12,699,420 B2
(45) Date of Patent: Aug. 4, 2026

(54) BODY WEARABLE COMPUTING DEVICE

(71) Applicant: Dell Products L.P., Round Rock, TX (US)

(72) Inventors: Seungmi Lee, Singapore (SG); Prabu Selvaraj, Singapore (SG); Chin Leong Ong, Singapore (SG); Michiel Sebastiaan Emanuel Petrus Knoppert, Amsterdam (NL); Weiyi Wang, Singapore (SG); Yan Yan, Singapore (SG); Si Fi Faye Li, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/788,819

(22) Filed: Jul. 30, 2024

(65) Prior Publication Data

US 2026/0037030 A1      Feb. 5, 2026

(51) Int. Cl.
*H04N 13/239*      (2018.01)
*G06F 1/16*      (2006.01)
(Continued)

(52) U.S. Cl.
CPC .......... *G06F 1/163* (2013.01); *G06F 3/03547* (2013.01); *G06F 3/16* (2013.01); *G10L 15/22* (2013.01); *H04N 13/239* (2018.05)

(58) Field of Classification Search
CPC ...... G06T 7/85; H04N 13/156; H04N 13/239; G06F 1/163; G06F 3/0357; G06F 3/16; G10L 15/22
(Continued)

(56) References Cited

U.S. PATENT DOCUMENTS

| | | | |
|---|---|---|---|
| 4,907,296 A | 3/1990 | Blecha | |
| 5,856,811 A | 1/1999 | Shih | |
| (Continued) | | | |

FOREIGN PATENT DOCUMENTS

| | | | | |
|---|---|---|---|---|
| CA | 3223178 A1 | 12/2022 | | |
| WO | WO 202006819 A1 * | 2/2020 | ............... | A61F 9/00 |
| (Continued) | | | | |

OTHER PUBLICATIONS

Erich Schneider et al., Gaze-Aligned Head-Mounted Camera with Pan, Tile, and Roll Motion Control for Medical Documentation and Teaching Applications, Oct. 2006, 2006 IEEE International Conference on Systems, Man, and Cybernetics (Year: 2006).*
(Continued)

*Primary Examiner* — William C Vaughn, Jr.
(74) *Attorney, Agent, or Firm* — WOMBLE BOND DICKINSON (US) LLP

(57) ABSTRACT
A body wearable computing device for providing computer-implemented services is disclosed. The body wearable computing device may include components adapted to perform various functions. To obtain inputs (e.g., images, audio, etc.) of at least a portion of a scene that the user is present, the body wearable computing device may include an integrated sensing and interaction component. The integrated sensing and interaction component may be adapted to be positioned symmetrically, between ears and eyes, on two portions of the user's head and may include cameras that capture stereo images of at least the portion of the scene in a field of view of the user. The body wearable computing device may also include an integrated computing, powering, and securing portion and an adjustment member. The body wearable computing device may perform actions (e.g., that may assist the user) based at least on the inputs obtained.

18 Claims, 6 Drawing Sheets

(51) Int. Cl.

| | |
|---|---|
| *G06F 3/0354* | (2013.01) |
| *G06F 3/16* | (2006.01) |
| *G10L 15/22* | (2006.01) |

(58) Field of Classification Search
USPC .......................................................... 348/47
See application file for complete search history.

(56) References Cited

U.S. PATENT DOCUMENTS

| | | | | |
|---|---|---|---|---|
| 7,810,750 | B2 * | 10/2010 | Abreu .................... | B65H 75/48 |
| | | | | 242/378.1 |
| 8,159,519 | B2 | 4/2012 | Kurtz | |
| 8,902,315 | B2 | 12/2014 | Fisher et al. | |
| 9,538,072 | B2 | 1/2017 | Stewart et al. | |
| 10,110,805 | B2 * | 10/2018 | Pomerantz et al. ......................... | |
| | | | | H04N 5/23229 |
| 10,163,210 | B2 | 12/2018 | Kim | |
| 10,389,993 | B2 | 8/2019 | Macmillan et al. | |
| 10,621,973 | B1 | 4/2020 | McVicker | |
| 10,924,651 | B2 | 2/2021 | Chaudhri et al. | |
| 11,196,863 | B2 | 12/2021 | Spohrer | |
| 11,206,325 | B1 | 12/2021 | Dennis | |
| 11,431,038 | B2 * | 8/2022 | Jhawar et al. ........ | H01M 10/44 |
| 11,431,660 | B1 | 8/2022 | Leeds et al. | |
| 11,489,996 | B2 | 11/2022 | Burton | |
| 11,523,055 | B1 | 12/2022 | Chaudhri et al. | |
| 11,523,243 | B2 | 12/2022 | Satongar et al. | |
| 11,567,569 | B2 | 1/2023 | Spencer | |
| 11,790,614 | B2 | 10/2023 | Zohar | |
| 11,816,269 | B1 | 11/2023 | Chaudhri et al. | |
| 11,899,911 | B2 | 2/2024 | Kocienda et al. | |
| 12,026,842 | B1 * | 7/2024 | Mayoral ............... | G06T 19/006 |
| 12,299,830 | B2 | 5/2025 | Zohar | |
| 2009/0122161 | A1 | 5/2009 | Bolkhovitinov | |
| 2011/0279666 | A1 | 11/2011 | Strombom | |
| 2012/0143605 | A1 | 6/2012 | Thorsen | |
| 2013/0069131 | A1 | 3/2013 | Kerber | |
| 2014/0146153 | A1 | 5/2014 | Birnkrant | |
| 2015/0009550 | A1 | 1/2015 | Misago | |
| 2016/0225192 | A1 | 8/2016 | Jones | |
| 2017/0007351 | A1 | 1/2017 | Yu | |
| 2017/0099479 | A1 | 4/2017 | Browd | |
| 2017/0181802 | A1 | 6/2017 | Sachs | |
| 2017/0322410 | A1 | 11/2017 | Watson | |
| 2018/0012413 | A1 | 1/2018 | Jones | |
| 2018/0325498 | A1 | 11/2018 | Bongiorno et al. | |
| 2019/0019508 | A1 | 1/2019 | Rochford | |
| 2019/0251970 | A1 | 8/2019 | Shukla | |
| 2019/0253700 | A1 | 8/2019 | Tornéus et al. | |
| 2019/0254754 | A1 | 8/2019 | Johnson | |
| 2019/0370532 | A1 * | 12/2019 | Soni et al. ......... | G06K 9/00268 |
| 2020/0043479 | A1 | 2/2020 | Mont-Reynaud | |
| 2020/0117025 | A1 | 4/2020 | Sauer | |
| 2020/0159836 | A1 | 5/2020 | Alkan | |
| 2020/0330179 | A1 | 10/2020 | Ton | |
| 2021/0056986 | A1 | 2/2021 | Shreeshreemak | |
| 2021/0067764 | A1 | 3/2021 | Shau | |
| 2021/0117680 | A1 | 4/2021 | Chaudhri et al. | |
| 2021/0169417 | A1 | 6/2021 | Burton | |
| 2021/0173480 | A1 * | 6/2021 | Osterhout et al. ...... | G06F 3/014 |
| 2021/0174805 | A1 | 6/2021 | Wang | |
| 2021/0256046 | A1 | 8/2021 | Newell | |
| 2022/0050580 | A1 | 2/2022 | Takimoto | |
| 2022/0171453 | A1 | 6/2022 | Powederly | |
| 2023/0071778 | A1 | 3/2023 | Du | |
| 2023/0111489 | A1 | 4/2023 | Zohar | |
| 2023/0280821 | A1 | 9/2023 | Kocienda et al. | |
| 2023/0280866 | A1 | 9/2023 | Kocienda et al. | |
| 2023/0281254 | A1 | 9/2023 | Kocienda et al. | |
| 2023/0281256 | A1 | 9/2023 | Kocienda et al. | |
| 2023/0282214 | A1 | 9/2023 | Kocienda et al. | |
| 2023/0283705 | A1 | 9/2023 | Chaudhri et al. | |
| 2023/0283885 | A1 | 9/2023 | Kocienda et al. | |
| 2023/0283886 | A1 | 9/2023 | Kocienda et al. | |
| 2023/0324993 | A1 | 10/2023 | McDaniel | |
| 2023/0327497 | A1 | 10/2023 | Chaudhri et al. | |
| 2023/0419621 | A1 | 12/2023 | Zohar | |
| 2024/0126363 | A1 | 4/2024 | Kocienda et al. | |
| 2024/0155194 | A1 | 5/2024 | Kocienda et al. | |
| 2024/0221738 | A1 | 7/2024 | Garg | |
| 2024/0242721 | A1 | 7/2024 | Kocienda et al. | |
| 2024/0310990 | A1 | 9/2024 | Beauchamp | |
| 2024/0403772 | A1 | 12/2024 | Lafreniere | |
| 2025/0199621 | A1 | 6/2025 | Moll | |
| 2025/0225995 | A1 | 7/2025 | von Liechtenstein | |
| 2025/0232400 | A1 | 7/2025 | Chen | |
| 2025/0342833 | A1 | 11/2025 | Rothschild | |

FOREIGN PATENT DOCUMENTS

| | | | |
|---|---|---|---|
| WO | 2020/257329 | A1 | 12/2020 |
| WO | 2023/168001 | A1 | 9/2023 |
| WO | 2023/168071 | A1 | 9/2023 |
| WO | 2023/168073 | A1 | 9/2023 |
| WO | 2024/118974 | A1 | 6/2024 |

OTHER PUBLICATIONS

Schneider et al., Movies Made Through the Eyes of a Mobile User with a Gaze-Aligned Camera, ICME 2006 (Year: 2006).*

Md Messal Monem Miah et al., "Multimodal Contextual Dialogue Breakdown Detection for Conversational AI Models", NAACL 2024 Industry Track, arXiv:2404.08156v1, Apr. 11, 2024, <https://arxiv.org/abs/2404.08156v1>, retrieved on Jul. 24, 2024 (12 pages).

Donggang Jia et al., "Voice: Visual Oracle For Interaction, Conversation, and Explanation", arXiv:2304.04083v2, Jan. 22, 2024, <https://arxiv.org/abs/2304.04083>, pp. 1-21, retrieved on Jul. 24, 2024 (21 pages).

Ambuj Mehrish et al., "A Review of Deep Learning Techniques for Speech Processing", arXiv:2305.00359v3, May 30, 2023, <https://arxiv.org/pdf/2305.00359>, pp. 1-111, retrieved on Jul. 24, 2024 (111 pages).

Giuseppe Attanasio et al., "Twists, Humps, and Pebbles: Multilingual Speech Recognition Models Exhibit Gender Performance Gaps", arXiv:2402.17954v2, Jun. 19, 2024, <https://arxiv.org/pdf/2402.17954>, retrieved on Jul. 24, 2024 (23 pages).

Konstantinos Tsiakas et al., "Unpacking Human-AI interactions: From interaction primitives to a design space", arXiv:2401.05115v1, Jan. 10, 2024, <https://arxiv.org/abs/2401.05115>, pp. 1-46, retrieved on Jul. 24, 2024 (46 pages).

Pabbathi Sri Charan et al., "Effective Gesture Based Framework for Capturing User Input", arXiv:2208.00913, Aug. 1, 2022, <https://arxiv.org/ftp/arxiv/papers/2208/2208.00913.pdf>, pp. 1-10, retrieved on Jul. 24, 2024 (10 pages).

Chao Chen et al., "Simple calibration method for dual-camera structured light system", Journal of the European Optical Society-Rapid Publications, 14, Article No. 23 (2018), Oct. 26, 2018, <https://doi.org/10.1186/s41476-018-0091-y>, pp. 1-11 pages, retrieved on Jul. 24, 2024 (11 pages).

David Pierce, "Limitless is a new AI tool for your meetings—and an all-hearing wearable gadget", The Verge, Apr. 15, 2024, <https://www.theverge.com/2024/4/15/24130832/limitless-ai-pendant-wearable-meetings> retrieved on Jul. 30, 2024 (8 pages).

\* cited by examiner

Flexible Band 111

Sensor Module 106

Camera 110

Integrated Sensing and
Interaction Component
100

Adjustment Member
102

Touchpad 108

Data Processing System
114

Bendable Hinge 112

Battery
116

Integrated Computing, Powering, and
Securing Portion
104

Body Wearable
Computing Device 50

Curved Headband 118

Adjustment Member
102

Integrated Sensing and
Interaction Component
100

Integrated Computing,
Powering, and Securing
Portion
104

Curved headband 118

Camera 110

Eye Line of Sight 140

Camera Line of Sight 142

BODY WEARABLE COMPUTING DEVICE

FIELD

Embodiments disclosed herein relate generally to a body wearable computing device. More particularly, embodiments disclosed herein relate to a body wearable computing device that provides computer-implemented services to a user when worn by the user.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
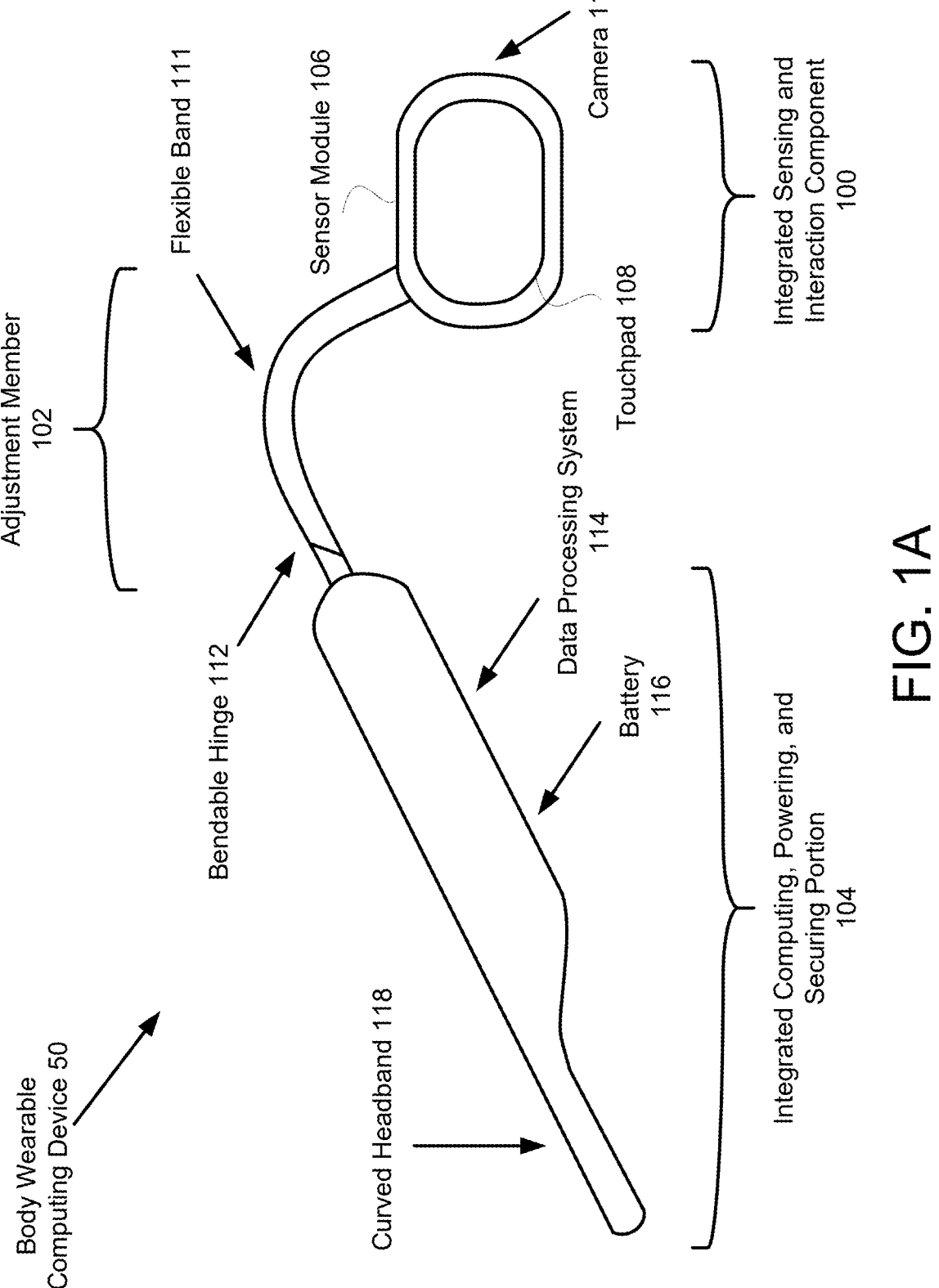
FIG. 1A shows a diagram illustrating a body wearable computing device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to a body wearable computing device. The body wearable computing device may be configured to be worn on a user's head. When worn by the user, the body wearable computing device may provide computer-implemented services by interacting with the user.

To perform its functionality, the body wearable computing device may include: (i) an integrated sensing and interaction component, (ii) an integrated computing, powering, and securing portion, and (iii) an adjustment member.

The integrated sensing and interaction component may be positioned symmetrically on both sides of the user's head, between ears and eyes of the user and proximate to temples of the user. The adjustment member may be configured to rest on the ears of the user (e.g., by hooking around the ears) and may include a bendable hinge to reposition the integrated computing, powering, and securing portion with respect to the integrated sensing and interaction component. In a first configuration of the adjustment member (e.g., when the bendable hinge is not bent), the integrated computing, powering, and securing portion may be configured to be positioned around the back of the user's head. By being positioned as such, the body wearable computing device may be worn and used to interact with the user without obstructing facial features (e.g., eyes, ears, etc.) of the user.

To interact with the user, the body wearable computing device may obtain inputs from the user and/or from a scene present in a field of view of the user, perform actions based on the inputs, provide responses to the user, and/or perform any other actions. To do so, the integrated sensing and interaction component may include: (i) a pair of cameras, (ii) speakers, (iii) a microphone array, (iv) a touch pad, and/or any other sensory components.

The pair of cameras may be configured to establish a camera line of sight parallel to a line of sight of the eyes of the user, and a camera field of view that includes the field of view of the eyes of the user. By doing so, the integrated sensing and interaction component may capture stereo images of at least a portion of a scene present in a field of view of the user.

Using at least the stereo images, a data processing system of the integrated computing, powering and securing portion may obtain an image processing result and a derived result from a remote entity (e.g., a cloud service) to identify actions to be performed.

The actions may be performed, for example, by communicating information to the user via the integrated sensing and interaction component. Additional sensors (e.g., a microphone array, touch pad) of the integrated sensing and interaction component may be used to output information, interact with the user, and/or perform any other actions.

Thus, embodiments disclosed herein may provide an improved form factor of a body wearable computing device that may provide computer-implemented services to a user. The form factor of the body wearable computing device may improve an effectiveness and/or usability of the body wearable computing device for the user based at least on positioning of components of the body wearable computing device.

In an embodiment, a body wearable computing device is provided. The body wearable computing device may include: (i) an integrated sensing and interaction component adapted to: (a) be positioned symmetrically on two portions of a user's head, (b) be positioned between ears and eyes of the user, and (c) capture a stereo image of at least a portion of a scene present in a field of view of the user; (ii) an integrated computing, powering, and securing portion; and (iii) an adjustment member adapted to position the integrated sensing and interaction component with respect to the integrated computing, powering, and securing portion.

The integrated sensing and interaction component may include: (i) a pair of cameras; (ii) speakers; (iii) a microphone array; and (iv) a touch pad.

The integrated sensing and interaction component may be adapted to: (i) obtain the stereo image from the pair of cameras; (ii) at least partially process the stereo image to obtain an image processing result; (iii) identify an action to be performed based, at least in part, on the image processing result and a derived result from a remote entity, the derived result being based, at least in part, on the stereo image and/or the image processing result; and (iv) use at least the speakers to perform the action.

The pair of cameras may comprise lenses configured to: (i) establish a camera line of sight that is parallel to a line of sight of the user; and (ii) establish a camera field of view that comprises the field of view of the user.

The stereo image may include a pair of images of the scene, each of the images being captured at different angles and/or positions with respect to the scene by the pair of cameras.

The adjustment member may include: (i) a flexible band; and (ii) a bendable hinge.

The adjustment member may be adapted to: (i) rest on an ear of the user while the body wearable computing device is used by the user; and (ii) bend at the bendable hinge to reposition the integrated computing, power, and securing portion with respect to the integrated sensing and interaction component.

The integrated computing, power, and securing portion may include: (i) a data processing system; (ii) a battery; and (iii) a curved headband.

The integrated computing, powering, and securing portion may be adapted to: (i) obtain the stereo image captured by the integrated sensing and interaction component; (ii) perform, by the data processing system, image stitching using the stereo image to obtain a unified image of the portion of the scene present in the field of view of the user; and (iii) provide the unified image to a remote entity for analysis.

The integrated computing, powering, and securing portion may be adapted to: (i) obtain an audio input from the integrated sensing and interaction component; (ii) perform, by the data processing system, a speech recognition action set, based on the audio input, to obtain a speech recognition result; (iii) obtain a portion of data from a remote entity, the data being based at least in part on the speech recognition result; and (iv) use the portion of the data to assist in an interaction that the user is involved in.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, various types of computing devices may provide computer implemented services. The various types of computing devices may include, for example, desktop computers, laptop computers, cell phones, and/or other types of computing devices.

Such computing devices may provide any number and types of computer-implemented services (e.g., to a user of the computing device and/or devices operably connected to the computing device). The computer-implemented services may include, for example, data acquisition services, communication services, and/or other types of services that may be relevant to user and/or other devices.

However, the ability to provide such services may be limited based on the information available to the computing devices. For example, desktop computer may be positioned under a desk, or in other locations. Consequently, the desktop computer may have a very limited capability to gather information regarding the environment in which it resides.

Accordingly, due to the limited information, the types and quality of computer implemented services may be limited. Returning to the desktop computer example, such desktop computers may lack native ability to capture images and/or audio of scenes that are relevant to a user of the desktop computer. Thus, the desktop computer may lack the ability to provide some types of services that are relevant to a user.

In general, embodiments disclosed herein relate to systems, methods, and devices for providing computer implemented services that are of relevance to users. To provide the computer implemented services, a body wearable computing device may be utilized. For example, body wearable computing device 50 may be adapted to be worn by a user. When worn by a user, the body wearable computing device may be able to gather information that is more relevant to users. Therefore, through use of this more relevant information, the body wearable computing device may be more likely to provide computer-implemented services that are of higher relevancy to users.

To provide the computer-implemented services to the user of body wearable computing device 50, body wearable computing device 50 may include: (i) integrated sensing and interaction component 100, (ii) adjustment member 102, and (iii) integrated computing, powering, and securing portion 104. Each of these components is discussed below.

Integrated sensing and interaction component 100 may provide input/output services to the user. To do so, integrated sensing and interaction component 100 may host sensors module 106, touchpad 108, camera 110, and/or any other components. To host the components, integrated sensing and interaction component 100 may include a pair of enclosures (e.g., 3-dimensional bubble-shaped housings that may be at least partially transparent) adapted to be positioned symmetrically on both sides of the user's head, between ears and eyes of the user (e.g., proximate to temples of the user). When worn, integrated sensing and interaction component 100 may operate, for example, without covering the user's ear and extending past the user's eyes. By being positioned as such, the body wearable computing device may be worn and used to interact with the user without obstructing facial features (e.g., eyes, ears, etc.) of the user.

Integrated sensing and interaction component 100 may obtain inputs from any number of sensors to identify actions to be performed. For example, integrated sensing and interaction component 100 may obtain an image from camera 110 and at least partially process the image to obtain an image processing result. Integrated sensing and interaction component 100 may subsequently obtain a result, based on image and/or the image processing result, from a remote entity (e.g., data processing system 114, a cloud service, etc.). The result may include, for example, performing an action using speakers of sensors module 106 to output information to the user.

Touchpad 108 may be used to receive tactile input. For example, a user may provide input by using one or more fingers to touch, press, any/or perform any other actions using touchpad 108. The input may be used, for example, to trigger actions, provide information to the body wearable computing device for use in providing computer-implemented services, and/or any other use cases. To improve ease of use, touchpad 108 may be affixed to a lateral side of integrated sensing and interaction component 100 away from the user's head when worn. Touchpad 108 may be included on either or both enclosures of integrated sensing and interaction component 100.

Sensor module 106 may provide at least a portion of the input/output services provided by integrated sensing and interaction component 100. To do so, sensors module 106 may include any number and/or type of sensors. For example, sensors module 106 may include speakers and a microphone array. Sensor module 106 may obtain audio input (e.g., via the microphone array), provide audio output (e.g., via the speakers), and/or perform any other actions. The audio output provided by sensor module 106 may include, for example, transmission of sound vibrations along a cheekbone of the user (e.g., bone conduction).

Camera 110 may capture images. The images captured by camera 110 may include stereo images of at least a portion of a scene present in a field of view of the user. The stereo images may include a pair of images of the scene, each of the images being captured at different angle and/or positions (e.g., different viewpoints) with respect to the scene by camera 110.

To do so, camera 110 may include a pair of cameras that may each be positioned inside an enclosure of the pair of enclosures of integrated sensing and interaction component 100 on both sides of the user's head between eyes and ears of the user. Furthermore, camera 110 may be pointed in a direction generally aligned with a direction that the user's eyes may be pointed. By being positioned as such, camera 110 may be configured to establish a camera line of sight that is parallel to a line of sight of the user, and a camera field of view that include the field of view of the user. Refer to FIGS. 1C-1D for additional details regarding the camera field of view and the camera line of sight relative to the user.

Adjustment member 102 may at least partially secure the body wearable computing device to the user's head and be adapted to position integrated sensing and interaction component 100 with respect to integrated computing, powering, and securing portion 104. To do so, adjustment member may include flexible band 111 and bendable hinge 112.

Flexible band 111 may be configured in a shape (e.g., a curved shape) that may enable adjustment member 102 to rest on an ear of the user while the body wearable computing device is used by the user. Furthermore, flexible band 111 (e.g., the shape of flexible band 111) may be modified (e.g., via bending) to improve comfort and/or fit of the body wearable computing device while used by the user.

Bendable hinge 112 may enable repositioning of integrated sensing and interaction component 100 with respect to integrated computing, powering, and securing portion 104. For example, when bendable hinge 112 is in a first state (e.g., not bent), integrated computing, powering, and securing portion 104 may be configured to be positioned around the back of the user's head while integrated sensing and interaction component 100 is positioned between ears and eyes of the user. Alternatively, when bendable hinge 112 is in a second state (e.g., bent at a certain angle), integrated computing, powering, and securing portion 104 may be configured to be positioned around the top of the user's head while integrated sensing and interaction component 100 is positioned between ears and eyes of the user.

Integrated computing, powering, and securing portion 104 may provide at least a portion of the computer-implemented services and may at least partially secure the body wearable computing device to the user. To do so, integrated computing, powering, and securing portion 104 may include an enclosure that includes: (i) data processing system 114, (ii) battery 116, and (iii) curved headband 118.

Data processing system 114 may provide computer-implemented services based on inputs (e.g., stereo images, audio inputs, etc.) obtained from integrated sensing and interaction component 100. To do so, data processing system 114 may host any quantity of hardware resources that may include, for example, a processor operably coupled to memory, storage, and/or other hardware components (e.g., sensors of integrated sensing and interaction component 100). Data processing system 114 may facilitate performance of actions requested by a user of the body wearable computing device (e.g., independently and/or cooperatively with remote entities that may provide a second portion of computer-implemented services).

Using the hosted hardware resources and/or applications supported by the hardware resources, data processing system 114 may provide services relevant to images, audio, text, decision making, and/or any other capabilities. For example, data processing system 114 may perform operations relevant to the service and/or data processing system 114 may communicate with remote entities using a network stack hosted by hardware resources of data processing system 114.

To provide services relevant to images (e.g., pictures, video, etc.), data processing system 114 may obtain image data from one or more cameras of camera 110. The image data may be used to identify user inputs (e.g., hand gestures) that may indicate requests for actions to be performed by the body wearable computing device. Data processing system 114 may subsequently make decisions to handle the requests based on the user input. Additionally, data processing system 114 may perform image stitching using a stereo image of the image data to obtain a unified image of a portion of a scene present in a field of view of the user. Data processing system 114 may process and/or perform actions based on derived information from the unified image.

To handle the requests based on the user inputs for decision making, data processing system 114 may utilize hardware and/or software adapted to process the user inputs. For example, data processing system 114 may use a tactile input handling application to make decisions (e.g., perform an action set, communicate information, etc.) based on tactile input received from touchpad 108.

Additionally, data processing system 114 may perform services based on audio input received from a microphone array of sensor module 106 that may include, for example, transcription, speaker segmentation, and/or any other service. To do so, data processing system 114 may, for example, host applications adapted to interpret conversations, recognize speech, convert speech to text, and/or perform any other operations. Data processing system 114 may similarly make decisions based on information obtained from the audio input.

To communicate results of the services to the user of the body wearable computing device, data processing system 114 may send information to be output from speakers of sensor module 106. To do so, data processing system 114 may utilize hardware and/or software to transmit the information to the speakers. For example, an application may convert text results obtained from the audio and/or image services, as discussed above, to an audio output format that may be communicated to the user.

Consider a scenario in which the unified image includes the user's hands and a sign with words written in a certain language. Data processing system 114 and/or integrated sensing and interaction component 100 may recognize hand gestures performed by the user's hands that may indicate a request for the body wearable computing device to translate and/or dictate a phrase written on the sign. Data processing system 114 may subsequently communicate the image and/or information from the image to any number and/or type of remote entities (e.g., cloud services, remote artificial intelligence platforms, etc.) that may provide additional services that may provide requested information/results to data processing system 114. Data processing system 114 may then provide instructions to integrated sensing and interaction component 100 to dictate (e.g., using speakers) the requested information.

Battery 116 may supply electrical power to data processing system 114, components of integrated sensing and interaction component 100, and/or any other entities. To do so, battery 116 may obtain and/or store electrical power provisioned by an external power source. The electrical power may subsequently be provided to components of the body wearable computing device that may request the electrical power for operation.

Curved headband 118 may connect two portions of the body wearable computing device. For example, curved headband may be configured in a curved shape and be adapted to connect a first side of the body wearable computing device (e.g., including a first portion of integrated sensing and interaction component 100, adjustment member 102, etc.) that may be positioned on the first side of the user's head to a second side of the body wearable computing device that may be positioned on the second side of the user's head.

While illustrated in FIG. 1A with a limited number of specific components, a system may include additional, fewer, and/or different components without departing from embodiments disclosed herein.

Thus, as shown in FIG. 1A, the body wearable computing device may provide computer-implemented services to a user using components adapted to improve effectiveness of the computer-implemented services and/or improve a usability of the body wearable computing device with respect to the user.

Figure 1B:
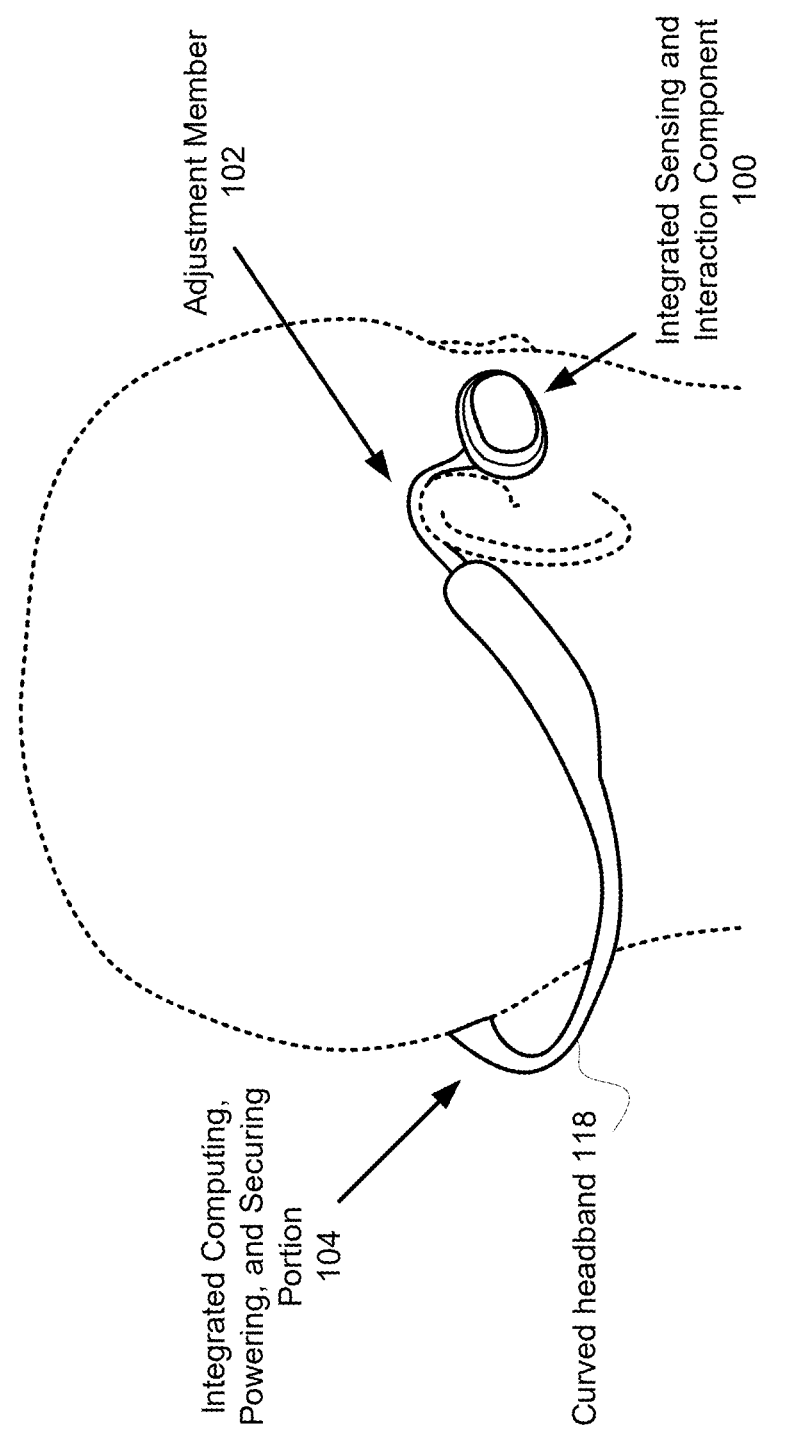
FIGS. 1B-1D show diagrams illustrating alternative views of the body wearable computing device in accordance with an embodiment.
Figure 1C:
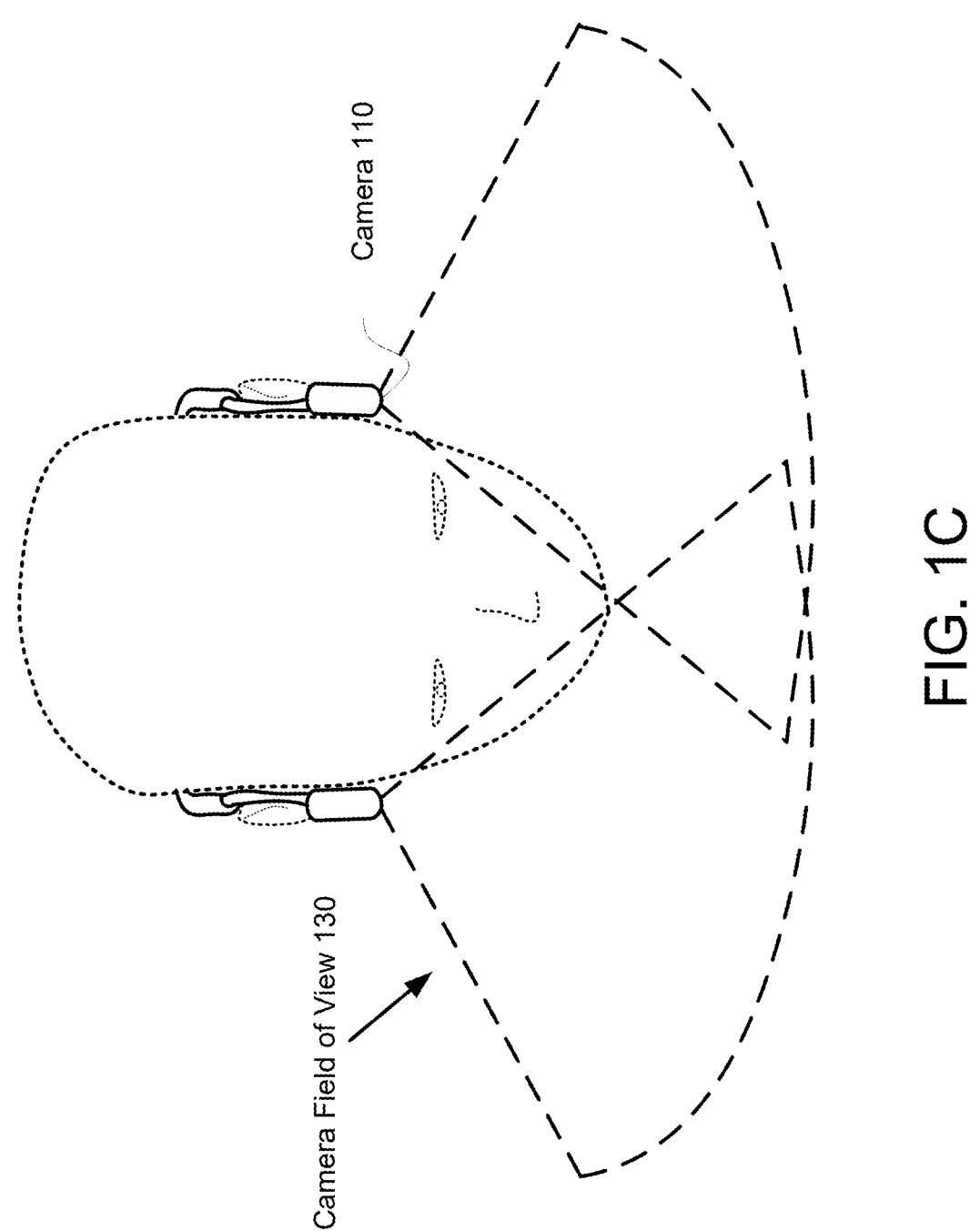
Figure 1D:
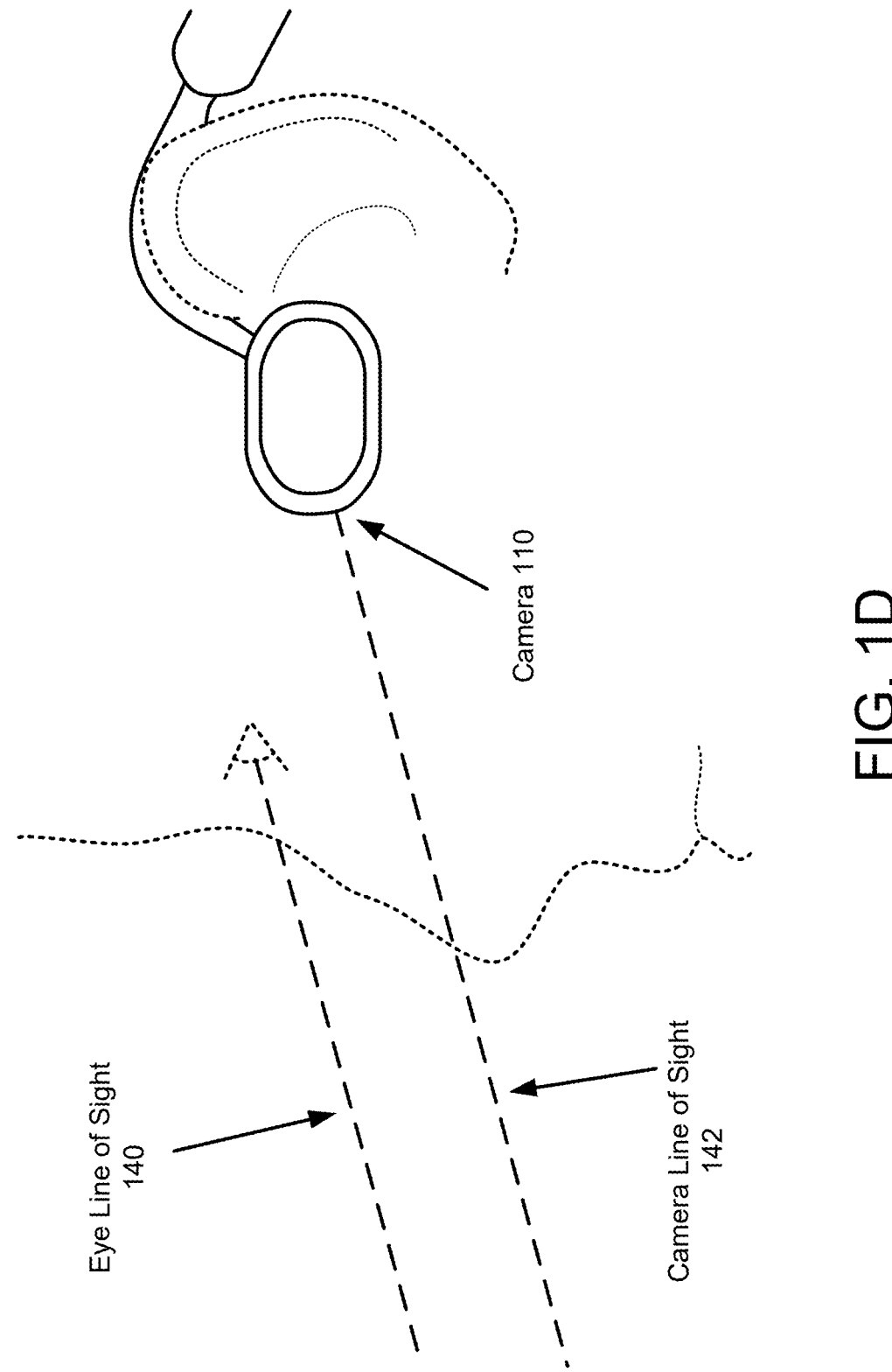

Turning to FIG. 1B, an alternate view of the body wearable computing device in accordance with an embodiment is shown.

In FIG. 1B, the body wearable computing device may be illustrated while worn by a user (drawn in short-dashed outline). As shown in FIG. 1B, a portion of integrated sensing and interaction component 100 of the body wearable computing device is positioned on a first side of the user's head between an eye and an ear of the user while a portion of adjustment member 102 rests on the ear of the user. While not shown, it may be appreciated that a second portion of integrated sensing and interaction component 100 and a second portion of adjustment member 102 may be similarly positioned on a second side of the user's head.

Integrated computing, powering, and securing portion 104 and curved headband 118 of integrated computing, powering, and securing portion 104 may connect the first portions and second portions of adjustment member 102 and integrated sensing and interaction component 100. To do so, curved headband 118 may wrap around the back of the user's head, as shown, while adjustment member 102 is in a first configuration (e.g., not bent). While not shown, it may be appreciated that curved headband 118 and integrated computing, powering, and securing portion 104 may be positioned around the top of the user's head and/or any other position when adjustment member 102 is in a second configuration.

Turning to FIG. 1C, a second alternate view of the body wearable computing device in accordance with an embodiment is shown. The second alternate view of the body wearable computing device may include a top-down view of the body wearable computing device while worn by a user (drawn in short-dashed outline) and may illustrate a camera field of view established by camera 110 (drawn in long-dashed outline).

Camera 110 of integrated sensing and interaction component 100 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish a portion of camera field of view 130. Camera field of view 130 may include an angular measurement that may indicate a viewable area that may be captured by the camera.

Camera field of view 130 may be established based on the lens (e.g., a focal length of the lens) and/or the sensor (e.g., a size of the sensor) of camera 110. Each camera of the pair of cameras of camera 110 may establish a portion of camera field of view 130 that may each capture a portion of a scene at different angles and/or positions with respect to the scene by the pair of cameras.

For example, consider a scenario in which camera field of view 130 is configured by camera 110 to be 120 degrees of horizontal view. Each camera of the pair of cameras of the body wearable computing device may capture an image based on the 120 degrees of the scene present in a field of view of the user. When aggregated (e.g., used together), a field of view of the images exceed a field of field of the user. The field of view of the user may include, for example, 120 degrees of viewable area based on binocular vision (e.g., a single image perceived from a pair of images view by a pair of eyes) of the user. The pair of cameras of camera 110 may similarly capture a stereo image that may include a pair of images of the portion of the scene present in the field of view of the user at the different angles and/or positions.

The stereo image may be processed (e.g., via image stitching, aggregation, etc.) by integrated sensing component 100, data processing system 114, and/or any other entities to generate a resulting image that may include at least the portion of the scene present in the field of view of the user (e.g., a greater field of view when compared to the user's field of view based on the user's binocular vision). The resulting image may subsequently provide information (e.g., additional information that the user may not obtain based on a field of view of the user's eyes) relevant to providing computer-implemented services to the user.

Thus, as shown in FIG. 1C, camera 110 of the body wearable computing device may be adapted to capture images of at least a portion of the scene present in a user's field of view. The images may provide visual information usable to perform desired actions by the body wearable computing device for the user.

Turning to FIG. 1D, a third alternate view of the body wearable computing device in accordance with an embodiment is shown. The third alternate view of the body wearable computing device may include a side view of the body wearable computing device while worn by a user and may illustrate a camera line of sight established by camera 110.

Camera 110 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish camera line of sight 142 that may be parallel to eye line of sight 140 of the user.

Camera line of sight 142 may enable camera 110 to capture images based on a vertical field of view that may be generally aligned with a vertical field of view of the user's eyes. The vertical field of view may be established, for example, by configuring cameras 110 (e.g., in a portrait orientation) to capture a vertical field of view that may include a vertical field of view of the user's eyes. By doing so, camera 110 may capture images of arm/hand movements and/or gestures when performed by the user.

Thus, as shown in FIG. 1D, cameras of the body wearable computing device may be adapted to capture images that may enable a user to interact with the body wearable computing device based on the user's line of sight.

Figure 2:
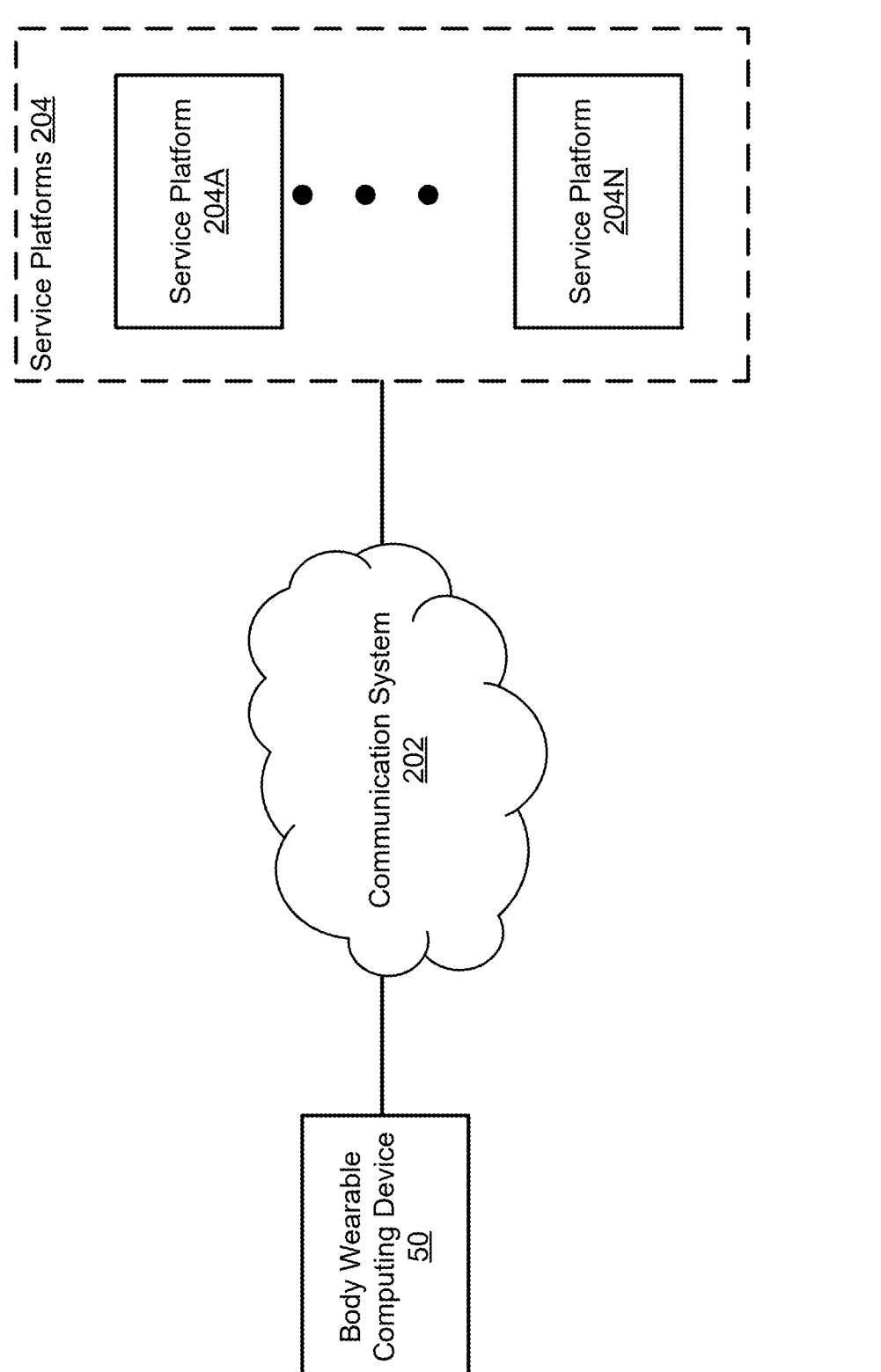
FIG. 2 shows a diagram illustrating a system in accordance with an embodiment.

Turning to FIG. 2, a block diagram in accordance with an embodiment is shown. The block diagram may illustrate a system used in providing computing-implemented services by the body wearable computing device.

Body wearable computing device 50 may, as previously discussed, provide computer-implemented services to a user. While providing the computer-implemented services, body wearable computing device 50 may interact with service platforms 204 to obtain information relevant to the computer-implemented services provided to the user.

Service platforms 204 may, as discussed above, provide remote computing services. Service platforms 204 may include any number and/or type of service platforms that may individually and/or cooperatively perform services requested by body wearable computing device 50. Service platforms 204 may include, for example, cloud services (e.g., speech-to-text, large language model, etc.), artificial intelligence platforms (e.g., generative artificial intelligence), and/or any other remote service platforms. Service platforms 204 may provide information based at least in part on input obtained from body wearable computing device 50.

For example, consider a scenario in which a user, while wearing body wearable computing device 50, may be looking at a bird perched on a tree in a forest. Body wearable computing device 50 may obtain a request (e.g., via a voice command captured by a microphone array of body wearable computing device 50, a gesture captured by cameras of from body wearable computing device 50, etc.) from the user indicating a desire for information regarding the bird. Body wearable computing device 50 may: (i) obtain data that may include an image of the scene, (ii) pre-process the data (e.g., focus the image on the bird, stitch images from a plurality of images captured by cameras of body wearable computing device 50, etc.) to obtain a unified image, (iii) communicate the unified image to a service platform (e.g., 204A) of service platforms 204, and/or perform any other actions. Service platform 204A may perform, for example, object recognition services, information search services, and/or any other services to generate and communicate derived information desired by the user (e.g., a breed of the bird, diet of the bird, etc.) based on the unified image provided by body wearable computing device 50. Once obtain, body wearable computing device 50 may output the desired information to the user (e.g., using the speakers).

Consider a second scenario in which a user of body wearable computing device 50 desires to generate a three-dimensional (3D) interactive model of a room that the user is present. Once a request for the 3D interactive model is identified, body wearable computing device 50 may: (i) provide instruction to the user (e.g., to move around the room), (ii) capture images using the camera at a certain frequency (e.g., while the user is moving around the room), and/or perform any other actions. Body wearable computing device 50 may provide the captured images along with metadata regarding each of the captured images to a second service platform (e.g., 204B) of service platforms 204. Using image data provided by body wearable computing device 50, service platform 204B may perform, for example, 3D rendering services, video editing services, video storage services, and/or any other services to generate the video desired by the user. Body wearable computing device 50 may subsequently communicate a status (e.g., completion, instructions for access, etc.) of the desired 3D interactive model to the user.

Consider a third scenario in which a user of body wearable computing device 50 may be having a conversation with a second person. During the conversation, the user may issue questions to body wearable computing device 50 that the user may desire answers for. Body wearable computing device 50 may: (i) obtain audio data (e.g., via a microphone array), (ii) transcribe the audio data to text data, (iii) identify an intent of the user to receive an answer from body wearable computing device 50 regarding a question, and/or perform any other actions. The text data may subsequently be provided to a third service platform (e.g., 204C) of service platforms 204. Service platform 204C may perform, for example, large language model services, text response services, and/or any other services to provide the desired response in text format to body wearable computing device 50. Once obtained, body wearable computing device 50 may perform text to speech services to communicate the requested response to the user.

Communication system 202 may allow any of body wearable computing device 50 and service platforms 204 to communicate with one another (and/or with other devices not illustrated in FIG. 2). To provide its functionality, communication system 202 may be implemented with one or more wired and/or wireless networks. Any of these networks may be a private network (e.g., the "Network" shown in FIG. 3), a public network, a virtual network (e.g., a virtual private network), and/or may include the Internet. For example, body wearable computing device 50 may be operably connected to service platforms 204 via the Internet, a private network, etc. Body wearable computing device 50 and service platforms 204 may be adapted to perform one or more protocols for communicating via communication system 202.

Any of (and/or components thereof) body wearable computing device 50 and service platforms 204 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 3.

Figure 3:
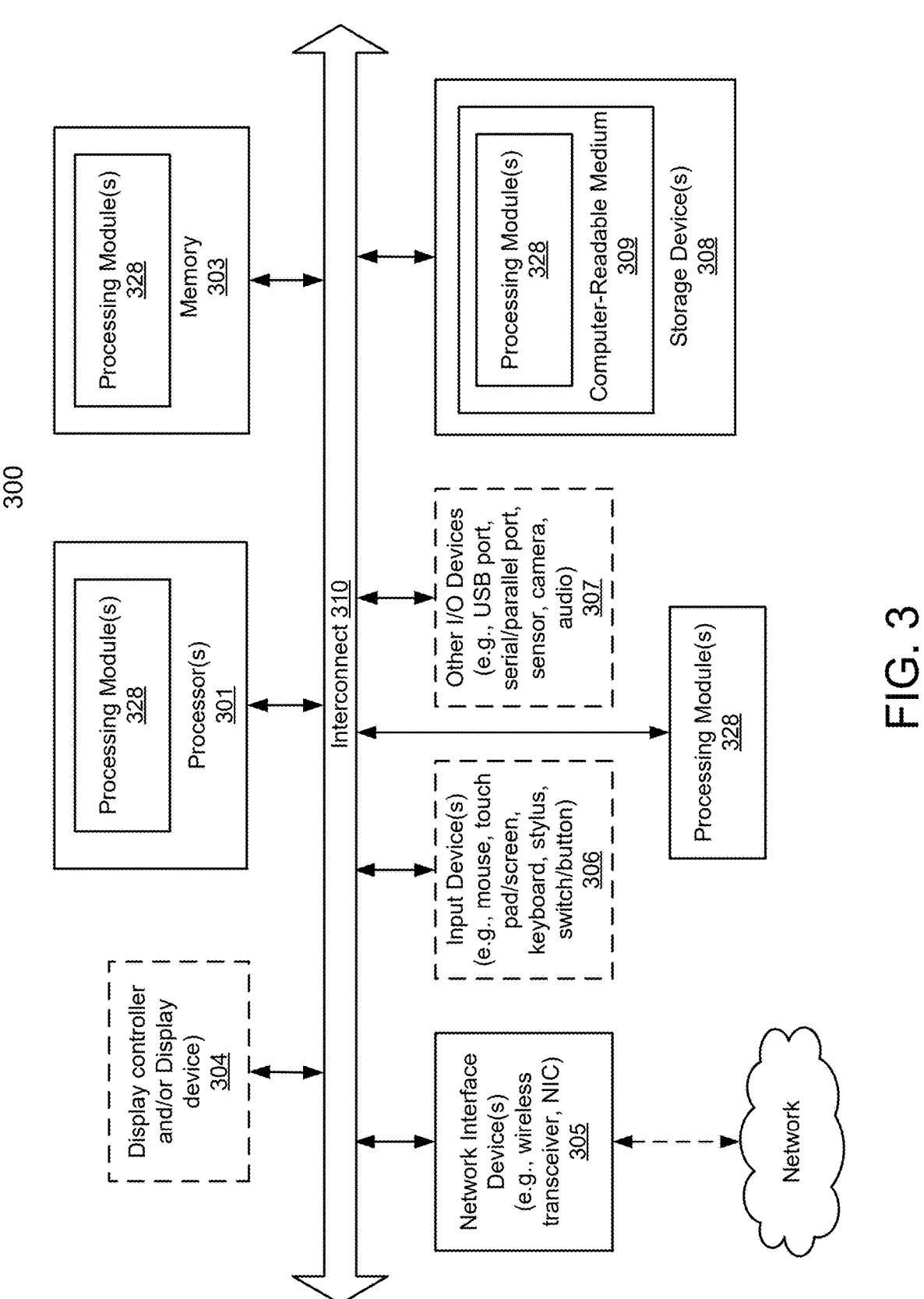
FIG. 3 shows a block diagram illustrating a data processing system in accordance with an embodiment.

Any of the components illustrated in FIG. 2 may be implemented with one or more computing devices. Turning to FIG. 3, a block diagram illustrating an example of a data processing system (e.g., a computing device) in accordance with an embodiment is shown. For example, system 300 may represent any of data processing systems described above performing any of the processes or methods described above. System 300 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 300 is intended to show a high level view of many components of the computer system. However, it is to be understood that additional components may be present in certain implementations and furthermore, different arrangement of the components shown may occur in other implementations. System 300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 300 includes processor 301, memory 303, and devices 305-307 via a bus or an interconnect 310. Processor 301 may represent a single processor or multiple processors with a single processor core or multiple processor cores included therein. Processor 301 may represent one or more general-purpose processors such as a microprocessor, a central processing unit (CPU), or the like. More particularly, processor 301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 301, which may be a low power multi-core processor socket such as an ultra-low voltage processor, may act as a main processing unit and central hub for communication with the various components of the system. Such processor can be implemented as a system on chip (SoC). Processor 301 is configured to execute instructions for performing the operations discussed herein. System 300 may further include a graphics interface that communicates with optional graphics subsystem 304, which may include a display controller, a graphics processor, and/or a display device.

Processor 301 may communicate with memory 303, which in one embodiment can be implemented via multiple memory devices to provide for a given amount of system memory. Memory 303 may include one or more volatile storage (or memory) devices such as random access memory (RAM), dynamic RAM (DRAM), synchronous DRAM (SDRAM), static RAM (SRAM), or other types of storage devices. Memory 303 may store information including sequences of instructions that are executed by processor 301, or any other device. For example, executable code and/or data of a variety of operating systems, device drivers, firmware (e.g., input output basic system or BIOS), and/or applications can be loaded in memory 303 and executed by processor 301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 300 may further include IO devices such as devices (e.g., 305, 306, 307, 308) including network interface device(s) 305, optional input device(s) 306, and other optional IO device(s) 307. Network interface device(s) 305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 306 may include a mouse, a touch pad, a touch sensitive screen (which may be integrated with a display device of optional graphics subsystem 304), a pointer device such as a stylus, and/or a keyboard (e.g., physical keyboard or a virtual keyboard displayed as part of a touch sensitive screen). For example, input device(s) 306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 307 may include an audio device. An audio device may include a speaker and/or a microphone to facilitate voice-enabled functions, such as voice recognition, voice replication, digital recording, and/or telephony functions. Other IO devices 307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 310 via a sensor hub (not shown), while other devices such as a keyboard or thermal sensor may be controlled by an embedded controller (not shown), dependent upon the specific configuration or design of system 300.

To provide for persistent storage of information such as data, applications, one or more operating systems and so forth, a mass storage (not shown) may also couple to processor 301. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 301, e.g., via a serial peripheral interface (SPI). This flash device may provide for non-volatile storage of system software, including a basic input/output software (BIOS) as well as other firmware of the system.

Storage device 308 may include computer-readable storage medium 309 (also known as a machine-readable storage medium or a computer-readable medium) on which is stored one or more sets of instructions or software (e.g., processing module, unit, and/or processing module/unit/logic 328) embodying any one or more of the methodologies or functions described herein. Processing module/unit/logic 328 may represent any of the components described above. Processing module/unit/logic 328 may also reside, completely or at least partially, within memory 303 and/or within processor 301 during execution thereof by system 300, memory 303 and processor 301 also constituting machine-accessible storage media. Processing module/unit/logic 328 may further be transmitted or received over a network via network interface device(s) 305.

Computer-readable storage medium 309 may also be used to store some software functionalities described above persistently. While computer-readable storage medium 309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 328, components and other features described herein can be implemented as discrete hardware components or integrated in the functionality of hardware components such as ASICS, FPGAs, DSPs or similar devices. In addition, processing module/unit/logic 328 can be implemented as firmware or functional circuitry within hardware devices. Further, processing module/unit/logic 328 can be implemented in any combination hardware devices and software components.

Note that while system 300 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A body wearable computing device, comprising:
an integrated sensing and interaction component adapted to:
be positioned symmetrically on two portions of a head of a user,
be positioned between ears and eyes of the user, and
capture a stereo image of at least a portion of a scene present in a field of view of the user;
an integrated computing, powering, and securing portion that includes a curved headband configured to wrap around a portion of a head of the user; and
an adjustment member adapted to position the integrated sensing and interaction component with respect to the integrated computing, powering, and securing portion;
wherein the adjustment member comprises:
a flexible band configured with a curved shape that rests on an ear of the user while the body wearable computing device is used by the user; and
a bendable hinge that connects a distal end the flexible band to the integrated computing, powering and securing portion, wherein, to reposition the integrated computing, power, and securing portion with respect to the integrated sensing and interaction component, the bendable hinge rotates between:

a first state in which the bendable hinge is straight such that the integrated computing, powering, and securing portion extends in a same direction as the distal end of the flexible band and the curved headband wraps around a back side of the head of the user; and a second state in which the bendable hinge is bent at a certain angle such that the integrated computing, powering, and securing portion extends in a different direction than the distal end of the flexible band and the curved headband wraps around a top side of the head of the user.

2. The body wearable computing device of claim 1, wherein the integrated sensing and interaction component comprises:

a pair of cameras;

speakers;

a microphone array; and a touch pad.

3. The body wearable computing device of claim 2, wherein the integrated sensing and interaction component is adapted to:

obtain the stereo image from the pair of cameras;

at least partially process the stereo image to obtain an image processing result;

identify an action to be performed based, at least in part, on the image processing result and a derived result from a remote entity, the derived result being based, at least in part, on the stereo image and/or the image processing result; and use at least the speakers to perform the action.

4. The body wearable computing device of claim 2, wherein the pair of cameras comprise lenses configured to:

establish a camera line of sight that is parallel to a line of sight of the user; and establish a camera field of view that comprises the field of view of the user.

5. The body wearable computing device of claim 2, wherein the stereo image comprises a pair of images of the scene, each of the images being captured at different angles and/or positions with respect to the scene by the pair of cameras.

6. The body wearable computing device of claim 1, wherein the integrated computing, powering, and securing portion comprises:

a data processing system;

a battery; and a curved headband.

7. The body wearable computing device of claim 6, wherein the integrated computing, powering, and securing portion is adapted to:

obtain the stereo image captured by the integrated sensing and interaction component;

perform, by the data processing system, image stitching using the stereo image to obtain a unified image of the portion of the scene present in the field of view of the user; and provide the unified image to a remote entity for analysis.

8. The body wearable computing device of claim 1, wherein, regardless of the first state or the second state of the bendable hinge, a central portion of the flexible band rests between a top portion of the ear of the user and a side of the head of the user and a proximal end of the flexible band extends forward and downward, relative to the ear, from the central portion to position the integrated sensing and interaction component entirely in front of the ear.

9. The body wearable computing device of claim 8, wherein the distal end of the flexible band extends backward and downward, relative to the ear, from the central portion to position the bendable hinge behind the ear.

10. The body wearable computing device of claim 6, wherein the integrated computing, powering, and securing portion is adapted to:

obtain an audio input from the integrated sensing and interaction component;

perform, by the data processing system, a speech recognition action set, based on the audio input, to obtain a speech recognition result;

obtain a portion of data from a remote entity, the data being based at least in part on the speech recognition result; and use the portion of the data to assist in an interaction that the user is involved in.

11. A system, comprising:

body wearable computing device, comprising:

an integrated sensing and interaction component adapted to:

be positioned symmetrically on two portions of a head of a user, be positioned between ears and eyes of the user, and capture a stereo image of at least a portion of a scene present in a field of view of the user;

an integrated computing, powering, and securing portion that includes a curved headband configured to wrap around a portion of a head of the user; and an adjustment member adapted to position the integrated sensing and interaction component with respect to the integrated computing, powering, and securing portion; and a computing system distinct from and remote to the body wearable computing device, the computing system being adapted to:

obtain information from the integrated computing, powering, and securing portion; and provide inferences based on the information to the integrated computing, powering, and securing portion, wherein the adjustment member comprises:

a flexible band configured with a curved shape that rests on an ear of the user while the body wearable computing device is used by the user; and a bendable hinge that connects a distal end the flexible band to the integrated computing, powering and securing portion, wherein, to reposition the integrated computing, power, and securing portion with respect to the integrated sensing and interaction component, the bendable hinge rotates between:

a first state in which the bendable hinge is straight such that the integrated computing, powering, and securing portion extends in a same direction as the distal end of the flexible band and the curved headband wraps around a back side of the head of the user; and a second state in which the bendable hinge is bent at a certain angle such that the integrated computing, powering, and securing portion extends in a different direction than the distal end of the flexible band and the curved headband wraps around a top side of the head of the user.

12. The system of claim 11, wherein the integrated sensing and interaction component comprises:

a pair of cameras;

speakers;

a microphone array; and a touch pad.

13. The system of claim 12, wherein the integrated sensing and interaction component is adapted to:

obtain the stereo image from the pair of cameras;

at least partially process the stereo image to obtain an image processing result;

identify an action to be performed based, at least in part, on the image processing result and a derived result from the computing system, the derived result being based, at least in part, on the stereo image and/or the image processing result; and use at least the speakers to perform the action.

14. The system of claim 12, wherein the pair of cameras comprise lenses configured to:

establish a camera line of sight that is parallel to a line of sight of the user; and establish a camera field of view that comprises the field of view of the user.

15. The system of claim 12, wherein the stereo image comprises a pair of images of the scene, each of the images being captured at different angles and/or positions with respect to the scene by the pair of cameras.

16. The system of claim 11, wherein the integrated computing, powering, and securing portion comprises:

a data processing system;

a battery; and a curved headband.

17. The system of claim 16, wherein the integrated computing, powering, and securing portion is adapted to:

obtain the stereo image captured by the integrated sensing and interaction component;

perform, by the data processing system, image stitching using the stereo image to obtain a unified image of the portion of the scene present in the field of view of the user; and provide the unified image to the computing system for analysis.

18. The system of claim 16, wherein the integrated computing, powering, and securing portion is adapted to:

obtain an audio input from the integrated sensing and interaction component;

perform, by the data processing system, a speech recognition action set, based on the audio input, to obtain a speech recognition result;

obtain a portion of data from the computing system, the data being based at least in part on the speech recognition result; and use the portion of the data to assist in an interaction that the user is involved in.

* * * * *